US009356804B1

(12) United States Patent
Passaglia et al.

(10) Patent No.: US 9,356,804 B1
(45) Date of Patent: May 31, 2016

(54) POLICY-BASED NETWORK CONNECTION RESOURCE SELECTION

(75) Inventors: Abraham M. Passaglia, Seattle, WA (US); Ravi R. Subramanian, Kirkland, WA (US); Jason G. McHugh, Seattle, WA (US); Hao Zhu, Anhui (CN); Paul F. Ferraro, Seattle, WA (US); Franklin Munoz Garcia, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 13/494,658

(22) Filed: Jun. 12, 2012

(51) Int. Cl.
  G06F 15/16     (2006.01)
  H04L 12/54     (2013.01)
  H04W 48/18     (2009.01)
  H04W 88/06     (2009.01)

(52) U.S. Cl.
  CPC ........... *H04L 12/5692* (2013.01); *H04W 48/18* (2013.01); *H04W 88/06* (2013.01)

(58) Field of Classification Search
  CPC ... H04L 12/5692; H04W 48/18; H04W 88/06
  USPC ......... 709/223, 224, 227, 238, 250, 202, 217, 709/219, 228; 726/1; 370/252, 254, 328, 370/329
  See application file for complete search history.

(56) References Cited

U.S. PATENT DOCUMENTS

| 8,516,129 | B1 * | 8/2013 | Skene | 709/227 |
| 2004/0107274 | A1 * | 6/2004 | Mastrianni et al. | 709/223 |
| 2005/0185653 | A1 * | 8/2005 | Ono et al. | 370/395.21 |
| 2005/0260989 | A1 * | 11/2005 | Pourtier et al. | 455/435.3 |
| 2006/0259951 | A1 * | 11/2006 | Forssell et al. | 726/1 |
| 2007/0242619 | A1 * | 10/2007 | Murakami et al. | 370/252 |
| 2009/0069018 | A1 * | 3/2009 | Babbar | 455/445 |
| 2010/0177711 | A1 * | 7/2010 | Gum | 370/329 |
| 2010/0287273 | A1 * | 11/2010 | Nasir et al. | 709/224 |
| 2010/0302958 | A1 * | 12/2010 | Wietfeldt et al. | 370/252 |
| 2011/0110309 | A1 * | 5/2011 | Bennett | 370/328 |
| 2011/0191484 | A1 * | 8/2011 | Babbar et al. | 709/228 |
| 2011/0199989 | A1 * | 8/2011 | Wietfeldt et al. | 370/329 |
| 2011/0282985 | A1 * | 11/2011 | Krantz et al. | 709/223 |
| 2012/0236772 | A1 * | 9/2012 | Kondratiev | 370/311 |
| 2012/0254448 | A1 * | 10/2012 | Wheeler et al. | 709/227 |
| 2013/0114504 | A1 * | 5/2013 | Zhao | 370/328 |
| 2013/0170380 | A1 * | 7/2013 | Hassan et al. | 370/252 |

* cited by examiner

*Primary Examiner* — Liangche A Wang
*Assistant Examiner* — Johnny Aguiar
(74) *Attorney, Agent, or Firm* — Polsinelli LLP

(57) ABSTRACT

The present disclosure introduces a layer of abstraction in the form of connection policies for applications to specify their needs for connections without having to worry about the specific details and particulars of requesting and receiving the connections. The various embodiments disclosed attempt to provide a connection in response to a request from an application wherein the application's request comprises a specified connection policy. Depending on the current state of the system/device, it can be determined whether to provide a connection that satisfies the specified connection policy or another available connection compliant with the current state of the system/device. In this way, a global optimization of the system/device and network resources can be achieved.

22 Claims, 5 Drawing Sheets

POLICY-BASED NETWORK CONNECTION RESOURCE SELECTION

BACKGROUND

Computing devices such as desktop computers, laptops, smart phones, tablets, and other mobile devices have grown to be an essential part of daily life. People use computing devices for a wide variety of purposes including for personal and professional use. Many of these devices transmit and receive data over a network (e.g., 2G, 3G, 4G, WiFi, Bluetooth, etc.), such as for email, SMS text messaging, accessing the Internet, and other types of communications. Client computing devices that require network data transmission typically operate independently from one another. Different applications (i.e., apps) that require network data transmission generally do not communicate with one another to determine (efficient) ways to utilize and/or share a network connection(s). Moreover, these devices usually make decisions on their own with respect to vital aspects such as determining a connection type, network interface, etc., in the process of acquiring and/or relinquishing a connection resource (e.g., a TCP socket) regardless of their transmission and bandwidth characteristics or destination endpoints. However, poor decisions by the devices in this regard can have a direct negative impact on device performance and battery life, which negatively affects overall user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing and/or managing network connections. In particular, various embodiments provide a layer of abstraction for applications, and other such object or entities, to specify their needs for connections in the form of connection policies without having to worry about the specific details and particulars of requesting and receiving the connections. Various embodiments attempt to provide a connection in response to a request from an application wherein the application's request comprises a specified connection policy. Depending on information such as the current state of the system, it can be determined whether to provide a connection that satisfies the specified connection policy or another available connection compliant with the current state of the system. In this way, a global optimization of the system and network resources can be achieved.

In at least some embodiments, the disclosed technology allows for intelligent matching of a connection request to an appropriate connection while taking into consideration available state information. An application can request for a connection and specify a connection policy. The connection policy can map to a set of connections that can satisfy the connection policy. For example, there can be a connection to endpoint XYZ that uses compression. Moreover, there can be another connection to endpoint XYZ via proxy ABC, wherein the connection also uses compression. An app can request for a connection to endpoint XYZ specifying that the connection should use compression. As such, the app's connection policy would map to both of the preceding connections in this example. Intelligent matching can attempt to satisfy the app's connection policy using whichever of the two preceding connections that would lead to global optimization, such that the system/device and all apps run most efficiently overall.

In some embodiments, a connection request can include two separate sets of connection policies. For example, a connection request can include a first set of connection policies that are required (e.g., must be met by the endpoint and/or server delivering the connection) and a second set of connection policies that are desired (e.g., the endpoint/server can try to make a "best effort" to satisfy the connection policy).

In some embodiments, global optimization cannot satisfy the desired connection policy(ies) of every app that specifies one. A goal of global optimization can be to ensure maximum overall efficiency of the system/device, apps, and/or networks. The satisfaction of a desired connection policy specified by an individual application may not be guaranteed, but an attempt (e.g., best effort) can be made to satisfy the desired connection policy.

Figure 1:
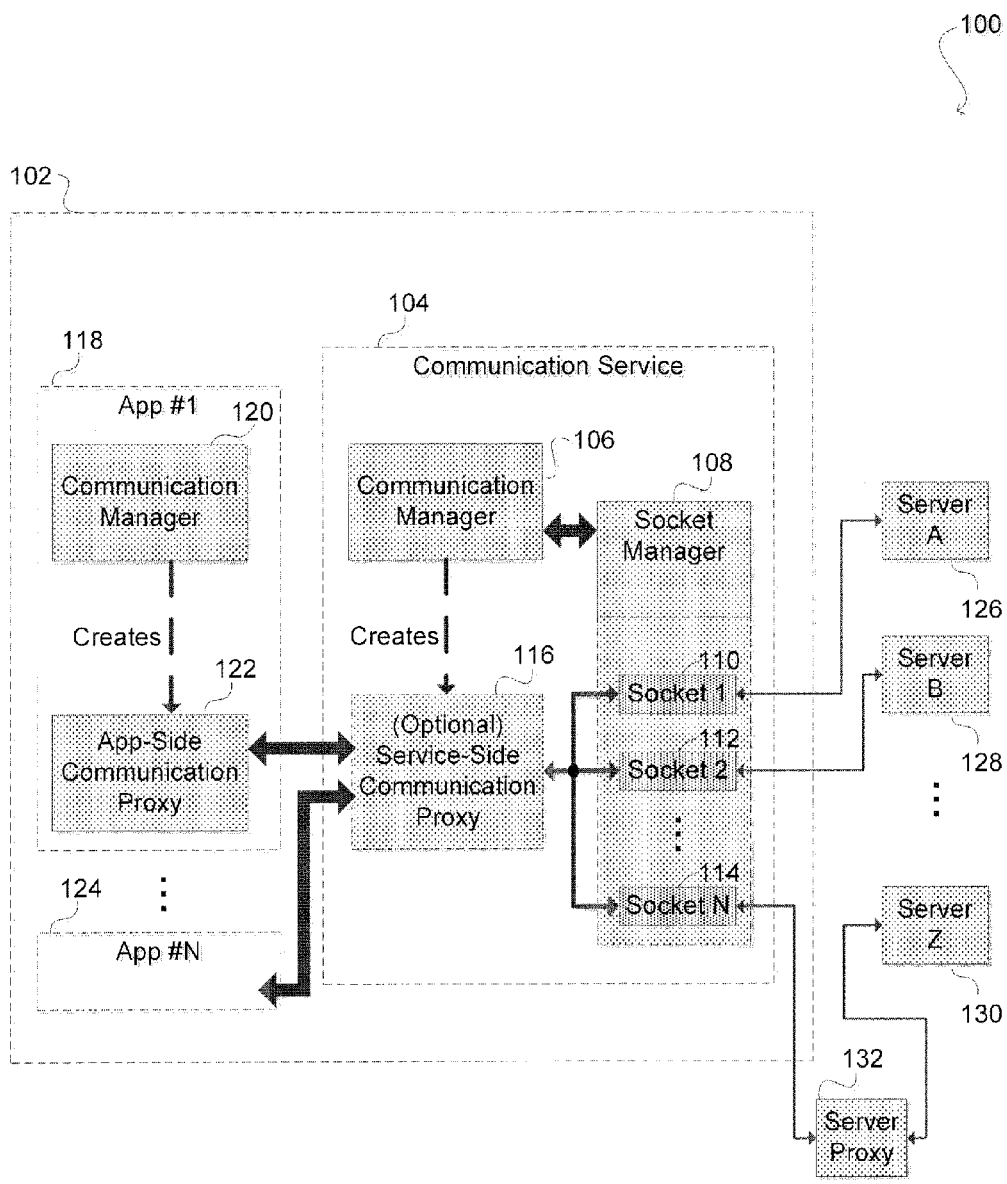
FIG. 1 illustrates an example system embodiment for policy-based network connection resource selection.

FIG. 1 illustrates an example system embodiment 100 for policy-based network connection resource selection. The example system embodiment 100 can comprise a computing device 102, a communication service 104, a communication manager 106, a socket manager 108, one or more sockets (e.g., 110, 112, 114), optionally a service-side communication proxy 116, one or more applications (e.g., 118, 124), a communication manager 120 for an application (e.g., 118, 124), an application-side communication proxy 122, one or more servers (e.g., 126, 128, 130), and one or more gateways (e.g., 132).

The communication service 104 can reside in its own process space. The service 104 can facilitate inter-process communication (IPC) among apps (e.g., 118, 124), itself 104, and servers (e.g., 126, 128, 130) such as backend servers. In some embodiments, the communication service can always be running, waiting, and/or listening for communications from one or more apps (e.g., 118, 124). In some embodiments, the communication service can comprise the communication manager 106, the socket manager 108, the one or more sockets (e.g., 110, 112, 114), and the optional service-side communication proxy 116.

The communication manager 106 can reside in the process space of the communication service 104. In some embodiments, the communication manager can provide a connection "broker" interface that intelligently decides how to provide and manage network connections. In some embodiments, the connection broker interface can be centralized such that one or more apps can communicate with it to request for a connection(s). For example, an application (e.g., 118, 124) can request for a connection and specify one or more properties of its required and/or preferred connection in the form of one or more "connection policies." In some embodiments, a subset of the one or more connection policies includes required connection policies while another subset includes desired connection policies. The broker interface can gather information about the current state of the system (including information about the needs of other apps) and determine whether or not it is possible to provide a connection that satisfies the connection policy(ies) (i.e., whether or not to provide the application's required and/or preferred connection). For example, a connection request can require a minimum amount of throughput and desire high bandwidth. If the broker interface determines that all high bandwidth connections are power/battery-intensive and the system is in a low power state, then the interface can decide not to provide a connection that would be power intensive but instead provide a connection requiring less power. However, the connection must still satisfy the required connection policy specifying a minimum amount of throughput. In another example, if the app requests a requirement for an encrypted connection to a particular server and the broker interface determines that an encrypted connection to that server already exists and is available, then the broker interface can provide to the app the already existing encrypted connection; alternatively, the interface can create a new encrypted connection to the particular server (e.g., assuming the app has no requirement for type of connection). In essence, the centralized mechanism/broker interface must satisfy an app's required connection policy(ies) and will attempt (e.g., make a best effort) to satisfy the app's desired connection policy(ies), but more importantly, it will try to achieve global optimization (instead of satisfying desired policies if need be).

Discussing connection policies in more detail, one or more connection policies can specify one or more properties required and/or preferred for a requested connection. For example, an app can specify in a connection policy that it requires a connection with a certain amount of throughput (e.g., high throughput, low throughput). In another example, an app can specify in one or more connection policies that it desires a connection that is encrypted, compressed, free or low cost (e.g., unlimited WiFi, paid/subsidized by third party), but throughput does not matter. Other examples of connection policies include (but are not limited to) latency (e.g., direct connection to an endpoint/server or connection via proxy, fast or slow, etc.), semantics (e.g., request/response semantics or advanced semantics, etc.), type of connection (e.g., preexisting connection is allowed or must be new connection, etc.), throughput, cost, and priority (e.g., high, normal, low, etc.). Moreover, further connection policy examples can include, but are not limited to, a roaming allowed policy (e.g., can a roaming connection be selected), a short-lived policy (e.g., does the connection need to last for a long time), a request response only policy (e.g., will the connection only be used for request-response functionality), a secure connection requirement policy (e.g., connection must be secure), and/or a WiFi requirement policy (e.g., connection must be established over WiFi). Again, desired connection policies are not necessarily guaranteed to be satisfied because such policies from an individual app are likely not as important as global optimization for the system and all apps. On the other hand, required connection policies must be satisfied in the connection to be delivered/established in response to the connection request.

Referring back to FIG. 1 and to the handling of IPC with one or more apps (e.g., 118, 124), the manager 106 can optionally create the service-side communication proxy 116. The optional service-side communication proxy 116 can communicate with the application-side communication proxy 122 and allow for an app to obtain a connection(s) via a socket(s). The service-side communication proxy can work together with the communication manager 106 and socket manager 108 to facilitate such IPC with apps.

The socket manager 108 can make available, track, and/or manage one or more sockets (e.g., 110, 112, 114) to facilitate IPC. The socket manager can read and/or write data on the sockets. The sockets can connect to endpoints such as servers (e.g., 126, 128, 130). In some embodiments, the sockets can be standard TCP sockets. The sockets can also be web sockets (e.g., WebSockets). For example, a web socket (e.g., WebSocket) can provide for full-duplex, two-way communications over a single TCP connection. Web sockets can be used in web browsers, web servers, and client and server applications. In some embodiments, data on the socket can be delivered to a TCP stack within a kernel and go on to a NIC for transmission. The sockets can connect the one or more apps to various endpoints/servers.

Each of the one or more applications (e.g., 118, 124) can be any software, program, module, process, mobile app, etc. In some embodiments, each application can reside in its own process space. In some embodiments, an application can have a library (e.g., client-side library) for communication infrastructure. The library can be used to access the communication manager 120 of the application.

In some embodiments, an application can comprise a communication manager 120 and an application-side communication proxy 122. The application-side communication manager 120 can be a software component (e.g., a class) which creates (client-side) objects to connect to the service-side proxy 116 in IPC. For example, the communication manager 120 can create the application-side communication proxy 122 and help facilitate communication with the communication service 104 by creating connections; an application can request a connection and provide arguments/parameters (e.g., specifying connection policies) via its communication manager which are then passed on to the communication service via IPC. The application-side proxy 122 created by the communication manager can then communicate with the service-side proxy 116 during IPC.

In some embodiments, the service-side communication proxy 116 is necessary for communication among the applications (e.g., 118, 124), the communication service 104, and/or the sockets (e.g., 110, 112, 114). In some embodiments, the optional service-side communication proxy 116 is not needed when communications occur within the communication service 104 process space. For example, without applications 118 and 124 communicating with the communication service 104, the optional service-side communication proxy 116 is not needed.

In some embodiments, there can be one or more gateways (e.g., 132) in a set of gateways to act as a proxy(ies) to one or more endpoints/backend servers. In some embodiments, a gateway can act as a proxy between itself and any other gateway in the set of gateways. In the example system embodiment, gateway 132 provides a proxy for Socket N 114 to connect to Server Z 130.

In some embodiments, the communication service 104 can access information regarding how different types of connections are performing. These types of connections can include, but are not limited to, 2G, 3G, WiFi, 4G, device-to-device Bluetooth/Bluetooth-direct, device-to-device WiFi/WiFi-direct, etc. Based on the information regarding how these different types of connections are performing, the communication service can elect to switch among the various connection types depending on various factors (e.g., current state information including the needs of apps) with the goal of achieving global optimization of the system.

In some embodiments, the communication service 104 and apps (e.g., 118, 124) can reside on a computing device 102. In some embodiments, the servers (e.g., 126, 128, 130) and gateways (e.g., 132) can reside apart from the computing device 102. The device 102 can include (but is not limited to) desktop computers, laptops, smart phones, tablets, and other mobile devices, etc. However, it is also contemplated that the various elements need not reside on a single computing device 102 but rather on multiple interconnected computing devices for example.

Figure 2:
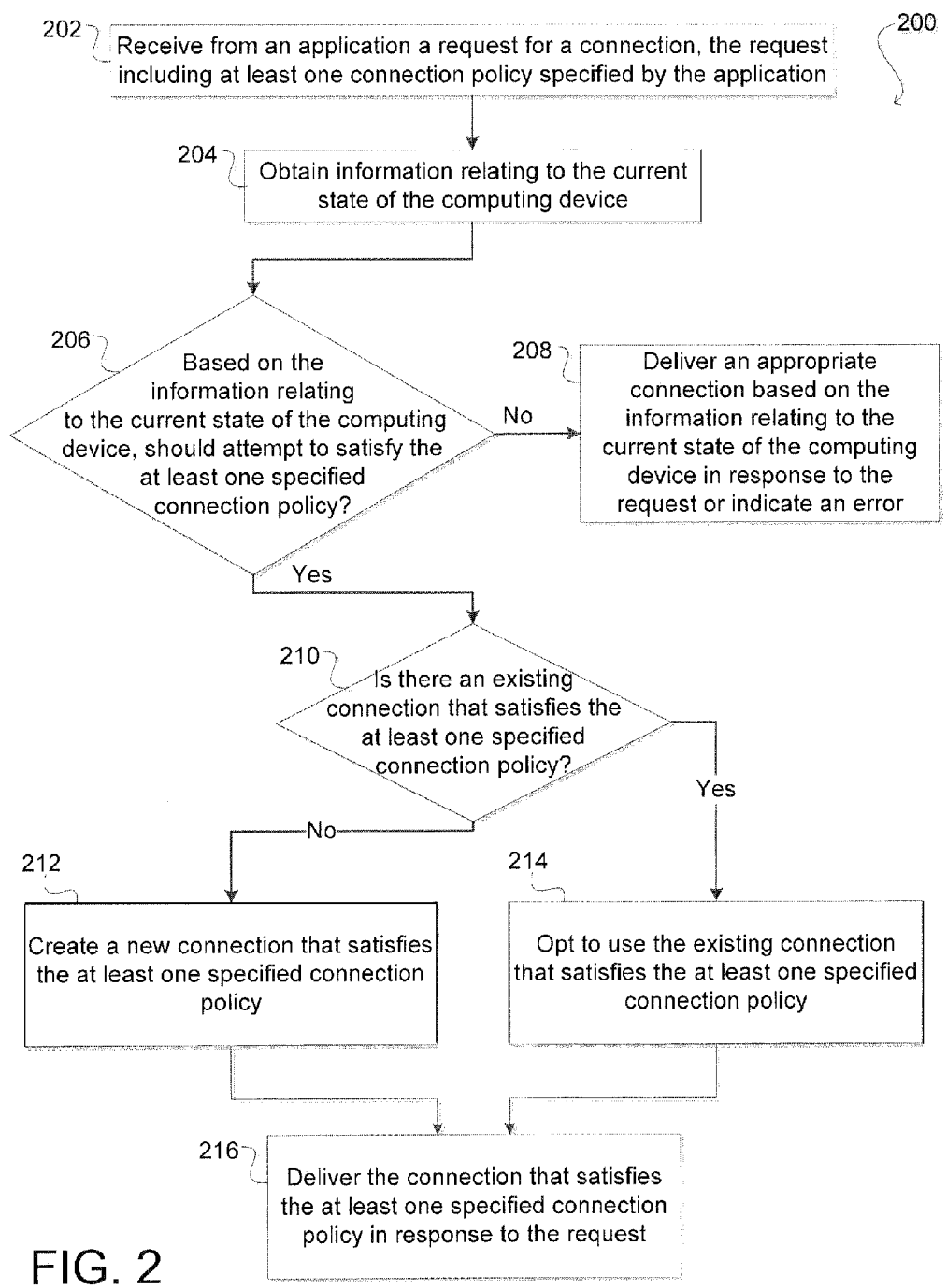
FIG. 2 illustrates an example method embodiment for policy-based network connection resource selection.

FIG. 2 shows an example method embodiment 200 for policy-based network connection resource selection. It should be understood that there can be additional, fewer, or alternative steps performed in similar or alternative orders, or in parallel, within the scope of the various embodiments unless otherwise stated. In this example, a request for a connection from an application is received, wherein the request includes at least one connection policy specified by the application 202. For example, an application can request to establish a connection, but requires that the connection has a minimal amount of throughput. The application's request can include a connection policy specifying the minimal amount of throughput that the application needs. In another example, the connection policy for the minimal amount of throughput can be a desired policy that the application prefers. Various types of connection policies are described above.

At step 204, the example method embodiment can obtain state information. For example, if the example method embodiment is performed on a system, then information regarding the current state of the system can be obtained. The information can include the battery level of the system if there it uses battery, the network status (e.g., network congestion, existing connections, available sockets, etc.), processing ability (e.g., how many apps and/or processes are running, how much physical and/or virtual memory is free, etc.), and other information about the system.

Based on the obtained state information, the method can determine whether or not it can and/or should attempt to satisfy the at least one connection policy specified by the application in its request for a connection 206. For example, if the policy is a required connection policy for a low-latency connection and it is determined that there are already many other low-latency connections, then perhaps the method cannot satisfy the connection policy requiring low-latency and no connection will be delivered/established; this can be because there are insufficient resources to provide for the other low-latency connections and to satisfy the connection policy requiring low-latency. In another example, if an app requests a connection and specifies compression as a desired connection policy but it is determined that another compressed connection to the same endpoint already exists and that it would be efficient for that connection to be shared, then the already existing compressed connection can be provided to the app; note that this can occur whether or not the app requested a new and independent connection (e.g., assuming the app has not required that type of connection). Again, for desired connection policies, there are no guarantees that they will be satisfied, but rather, attempts will be made (e.g., best effort) to satisfy them.

If, based at least in part on the obtained state information (including information about the needs of other apps), the example method decides not to provide a connection satisfying a specified desired connection policy, then the method can nonetheless deliver/establish an appropriate connection 208 in response to the request; however, if an appropriate connection cannot be established, then the method embodiment can indicate an error. In some embodiments, an appropriate connection can be a connection that satisfies a specified required connection policy but not a desired policy. In some embodiments, an appropriate connection can be a connection available and compliant with the current state information (e.g., satisfying both required and desired policies). For example, if an app had requested a desired high throughput connection but the method decided not to comply (e.g., because too costly), then perhaps the method can still deliver a normal or low throughput connection since that would be better than no connection at all; if the app had instead requested a required high throughput connection, then the connection delivered/established in response to the request must be a high throughput connection.

Moving on, if the obtained information relating to the current state warrants satisfying the at least one connection policy (or an attempt at satisfying desired policies), then the method proceeds to step 210, at which it checks whether or not there is a preexisting connection that satisfies the at least one connection policy and can be shared. If so, the method can decide for the app to utilize (e.g., share) the preexisting connection 214. If not, the method can create a new connection satisfying the connection policy 212. For example, if a request includes at least one connection policy that calls for a required/desired low-latency connection, the method can check whether or not there is a preexisting low-latency connection that can be shared and that has the same endpoint as that of the request. If so, the method can opt to let the requesting app use that preexisting low-latency connection. If not, the method can opt to create a new connection to satisfy the connection policy of the request. At step 216, the method delivers to the app whichever connection (e.g., preexisting or new) it has opted to use (e.g., assuming the app did not specify a required type of connection).

In some embodiments, the connection delivered to (e.g., established for use by) the application in response to the application's request appears to be a normal connection from the application's perspective. In other words, the application does not have to worry about handling a special kind of connection even though its request can include a specified connection policy; the application does not need to engage in a special procedure for handling a returned connection in response to a request specifying a connection policy(ies). In some embodiments, an application just sends a request for a connection including one or more specified connection policies and waits for a connection to be returned in response to its request. In this way, policy-based network connection resource selection does not require significant effort on the part of the application and can be a transparent process from the application's perspective.

Again, it should be understood that there can be additional, fewer, or alternative steps performed in similar or alternative orders, or in parallel, within the scope of the various embodiments unless otherwise stated. For example, in some embodiments, the method embodiment 200 can receive a request for a connection specifying a connection policy 202, obtain current state information 204, check for an existing connection that satisfies the connection policy 210, use the existing connection that satisfies the connection policy 214 or create a new connection that satisfies the connection policy 212, and deliver/establish the connection 216.

Figure 3:
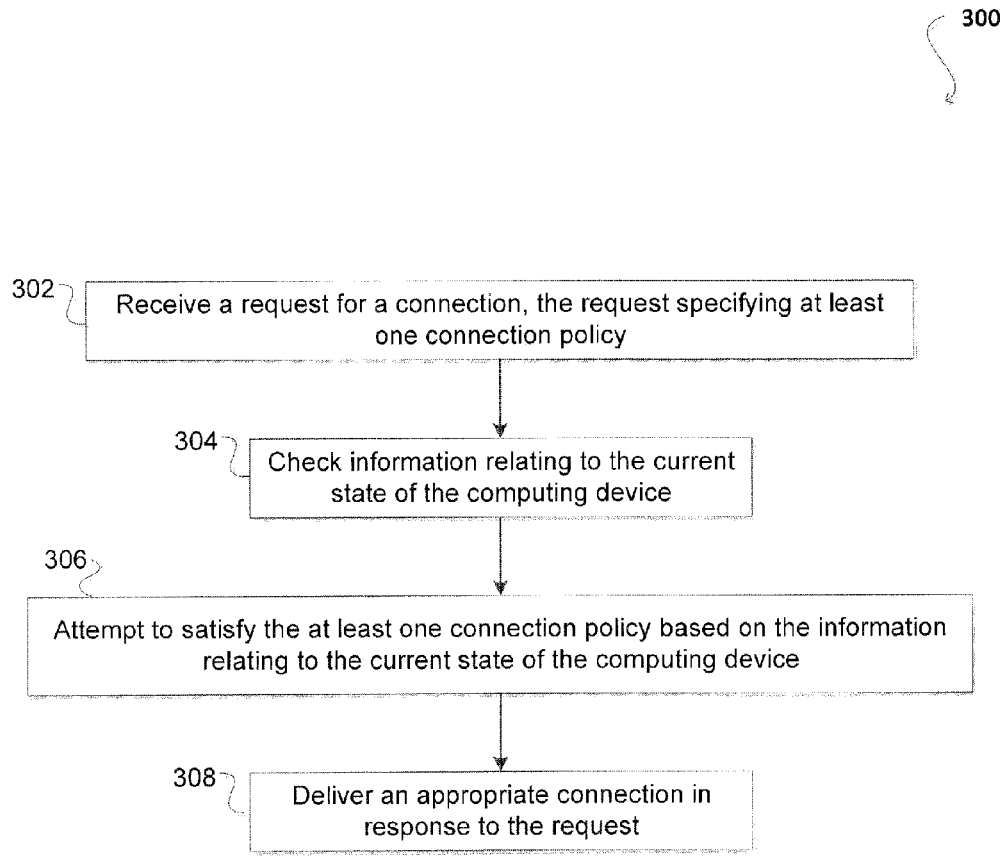
FIG. 3 illustrates an example method embodiment for policy-based network connection resource selection.

FIG. 3 illustrates an example method embodiment 300 for policy-based network connection resource selection. As previously stated, it should be understood that there can be additional, fewer, or alternative steps performed in similar or alternative orders, or in parallel, within the scope of the various embodiments unless otherwise stated. In this example method embodiment 300, a request for a connection is received, wherein the request specifies at least one connection policy 302. The method checks the current state information of the computing device 304. (It is fully contemplated that the current state information can be with respect to any environment n which the method is executing (i.e., any computing device such as a system, desktop computer, laptop, smart phone, tablet, etc.)). Based on the current state information, the method decides whether or not it can provide a connection that satisfies the at least one connection policy 306. That is to say, the method can select a network connection resource depending on the current state information; for desired connection policies, the method can select a connection that satisfies the at least one (desired) connection policy if the current state so allows, or another appropriate connection that is in agreement with the current state; for required connection policies, the method must select a connection that satisfies the at least one (required) connection policy or otherwise fail to deliver/establish a connection. At step 308, the method delivers/establishes the selected connection in response to the request.

In some embodiments, a connection between a socket and a server could be lost for whatever reason, and thus the app can lose communication with the server (e.g., the connection can be lost while the server is busy processing a request). However, the disclosed technology can either provide a new connection directly or through a proxy via a gateway, such that the app does not need to worry about the lost connection. As long as the app knows the endpoint/server to send to and receive from, the disclosed technology can automatically replace a lost connection and/or reroute a communication pathway to access the endpoint/server. For example, if a device moves out of Bluetooth-direct or WiFi-direct range and loses its connection, the disclosed technology can automatically reestablish the connection using the Internet/cloud service. This is an example of losing a connection but establishing asymmetrical return path.

In some embodiments, if a client computing device specifically requests a connection for standard HTTP request functionality, the centralized broker can provide a special connection (e.g., one that satisfies one or more connection policies) or a regular connection for standard HTTP request functionality in response to the request. This can also be hidden from the client so it does not have to worry about the specifics of whichever the connection is provided.

In some embodiments, a plurality of apps can use a single socket/connection between the apps and an endpoint/server. The disclosed technology can provide automatic multiplexing among the plurality of apps. Moreover, the disclosed technology can automatically attempt to ensure general fairness regarding the sharing of the socket/connection among the plurality of apps. As already stated above, it is also possible for an app to specify as a connection policy to not share a connection but rather use a single connection by itself, in which case there can be an attempt to satisfy the policy, but no guarantees.

In some embodiments, the disclosed technology can automatically handle authentication such that applications do not need to worry about authentication procedures. Additionally, in some embodiments, the disclosed technology allows for quick, short-term connections. In other words, it is contemplated that the technology disclosed can provide a "quick and dirty" temporary connection if an app so request. For example, if an application just needs a "one-time" connection (e.g., without specifying connection policies), the centralized connection broker can provide one. Moreover, in some embodiments, the disclosed technology can allow for "on the fly" connection policies. In other words, the centralized connection broker can receive dynamic updates from an application to add, change, and/or remove one or more connection policies. For example, an app initially specified a free or low cost connection, but subsequently, an event occurred in the app triggering a need for higher throughput. The app can then dynamically update its connection policies by removing its free or low cost connection policy and adding a high throughput connection policy.

Figure 4:
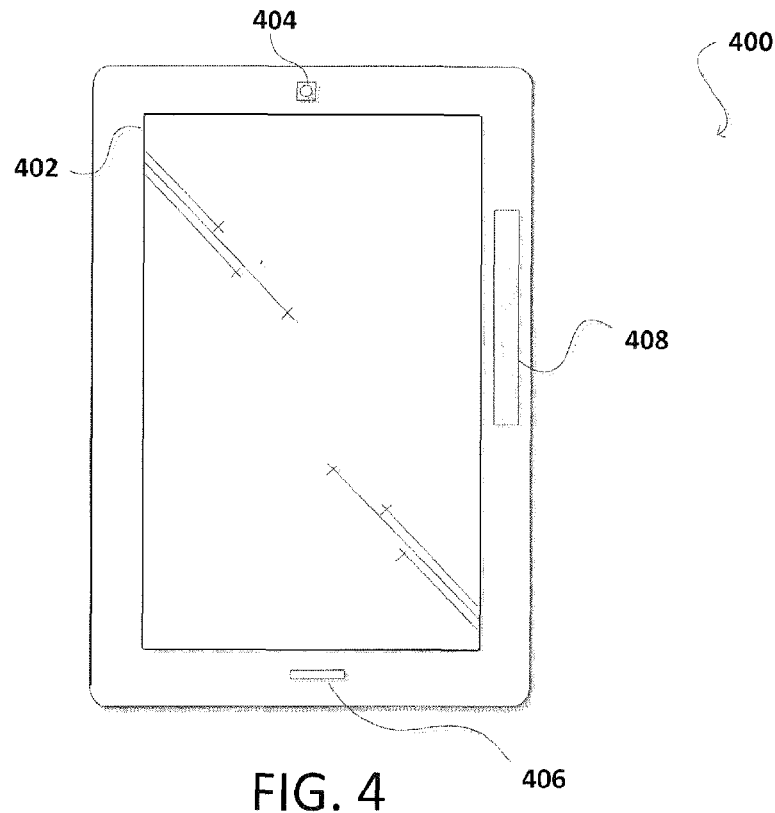
FIG. 4 illustrates an example device that can be used to implement aspects of the various embodiments.

FIG. 4 illustrates an example electronic user device 400 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 400 has a display screen 402 on the front side, which under normal operation will display information to a user facing the display screen (e.g., on the same side of the computing device as the display screen). The computing device in this example includes at least one camera 404 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 400 also includes at least one microphone 406 or other audio capture device capable of capturing audio data, such as words or commands spoken by a user of the device. In this example, a microphone 406 is placed on the same side of the device as the display screen 402, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 400 also includes at least one orientation sensor 408, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 5:
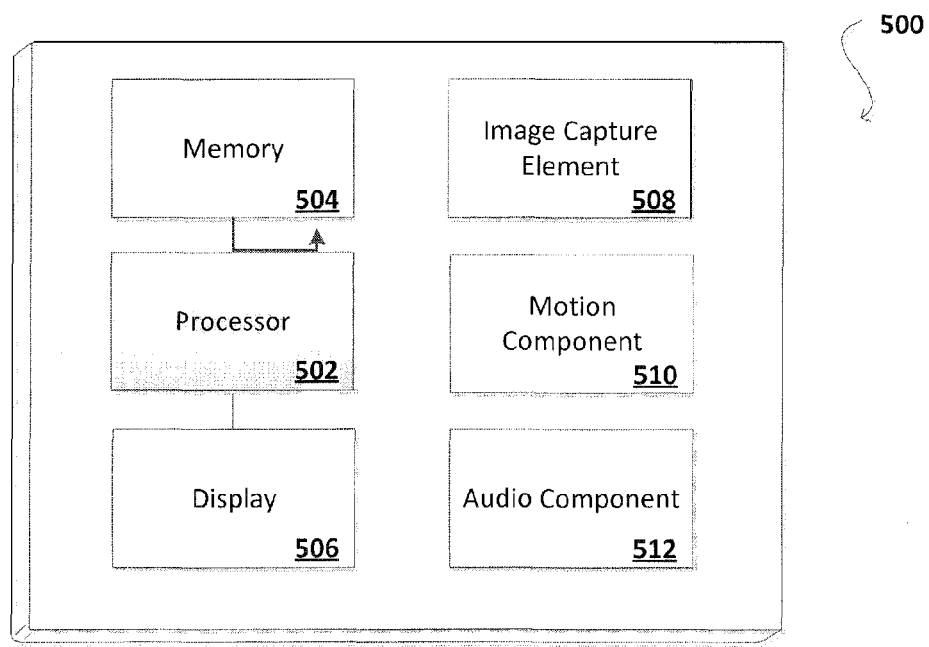
FIG. 5 illustrates example components of a client device such as that illustrated in FIG. 4.

FIG. 5 illustrates a logical arrangement of a set of general components of an example computing device 500 such as the device 400 described with respect to FIG. 4. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one image capture element 508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 512, such as a mono or stereo microphone or microphone array, operable to capture audio information from at least one primary direction. A microphone can be a uni- or omni-directional microphone as known for such devices.

In some embodiments, the computing device 500 of FIG. 5 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor 510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (UPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

As an example, a computing device such as that described with respect to FIG. 4 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 6:
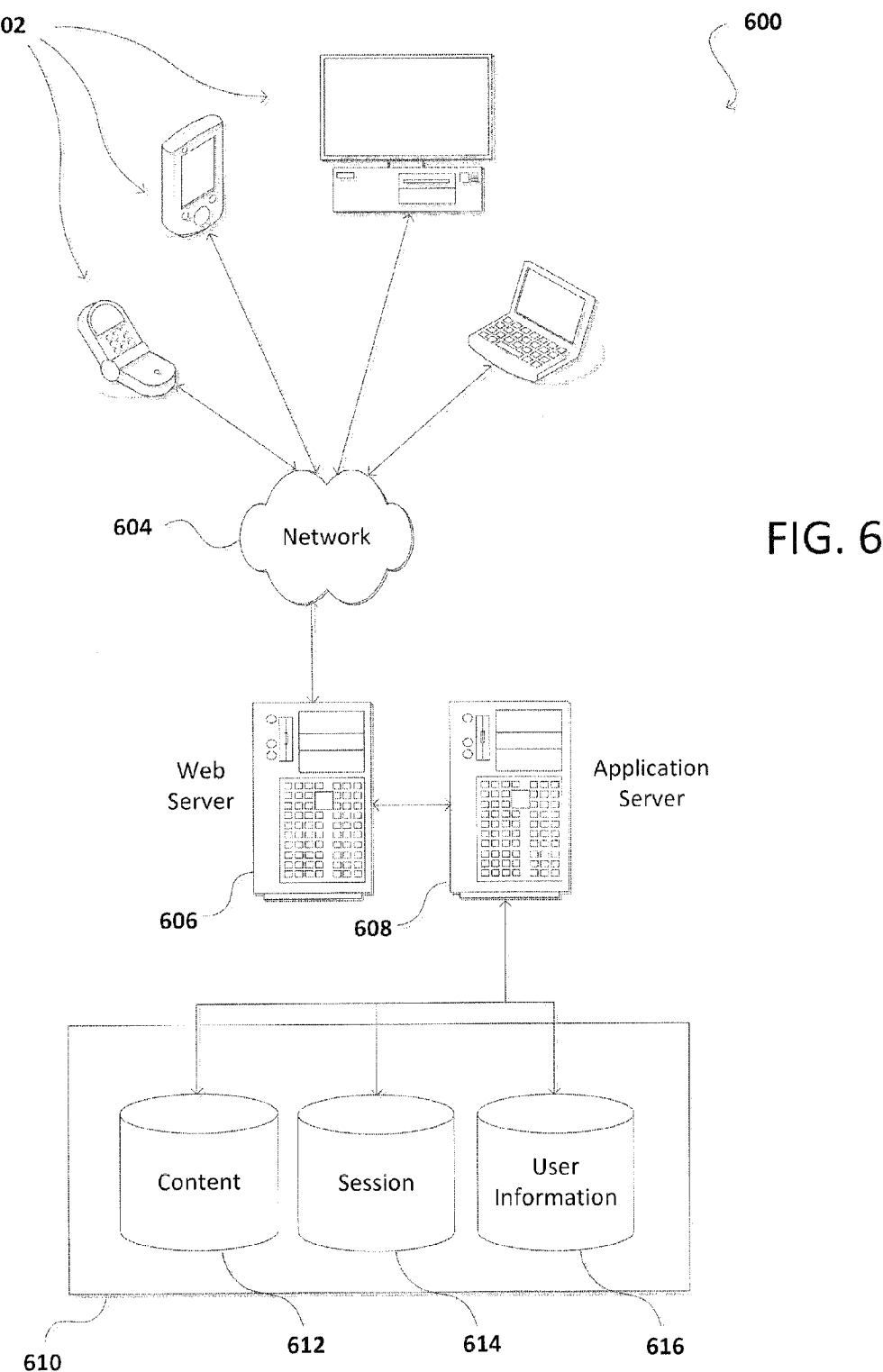
FIG. 6 illustrates an environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 602. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"), Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGT servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TO, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for policy based network connection selection, comprising:
   receiving, at a computing device, a request from an application for a web socket connection, the request including a first set of web socket connection policies and a second set of web socket connection policies specified by the application, the second set of web socket connection policies including at least one first web socket connection policy and at least one second web socket connection policy, the first set of web socket connection policies corresponding to a first amount of throughput to establish the web socket connection, and the at least one second web socket connection policy of the second set of web socket connection policies corresponding to a second amount of throughput larger than the first amount of throughput to establish the web socket connection;
   obtaining current state information about the computing device, wherein the current state information includes information relating to at least one of an existing web socket connection, a future web socket connection, a web socket connection policy of a second application, battery information, location information, network congestion information, network availability information, processor information, memory information, or applications information;
   determining a first web socket connection satisfies the at least one first web socket connection policy of the second set of web socket connection policies based at least in part on the current state information;
   determining the first web socket connection does not satisfy the at least one second web socket connection policy of the second set of web socket connection policies based at least in part on the current state information;
   determining the first web socket connection satisfies the first set of web socket connection policies based at least in part on the current state information;
   establishing the first web socket connection using the first set of web socket connection policies and the at least one first web socket connection policy of the second set of web socket connection policies;
   receiving dynamic event information associated with the application; and
   updating one of the first set of web socket connection policies or the at least one first web socket connection policy of the second set of web socket connection policies based at least in part on the dynamic event information.

2. The computer-implemented method of claim 1, wherein the first web socket connection is one of a new web socket connection or a preexisting web socket connection.

3. The computer-implemented method of claim 1, further comprising:
   determining the first web socket connection has been terminated; and
   establishing a replacement web socket connection automatically.

4. The computer-implemented method of claim 1, wherein at least one of the first set of web socket connection policies or the second set of web socket connection policies includes at least one of an encryption connection policy, a compression connection policy, a latency connection policy, a throughput connection policy, a cost policy, a roaming allowed policy, a short-lived policy, a request response only policy, a secure connection requirement policy, a WiFi requirement policy, or a priority policy.

5. A computer-implemented method comprising:
   receiving, at a computing device, a request for a connection, the request specifying a first set of connection policies and a second set of connection policies, the second set of connection policies including at least one first connection policy and at least one second connection policy, the first set of connection policies corresponding to a first amount of throughput to establish the connection, and the at least one second connection policy of the second set of connection policies corresponding to a second amount of throughput larger than the first amount of throughput to establish the connection;
   checking current state information about the computing device, wherein the current state information includes information relating to at least one of an existing connection, a future connection, a connection policy of a second application, battery information, location information, network congestion information, network availability information, processor information, memory information, or applications information;
   determining a first connection satisfies the at least one first connection policy of the second set of connection policies based at least in part on the current state information;
   determining the first connection does not satisfy at least one second connection policy of the second set of connection policies based at least in part on the current state information;

determining the first connection satisfies the first set of connection policies based at least in part on the current state information;

establishing the first connection using the first set of connection policies and the at least one first connection policy of the second set of connection policies;

receiving dynamic event information associated with an application; and updating one of the first set of connection policies or the at least one first connection policy of the second set of connection policies based at least in part on the dynamic event information.

6. The computer-implemented method of claim 5, wherein the request is received from the application.

7. The computer-implemented method of claim 5, wherein the first connection includes one of a new connection or a preexisting connection.

8. The computer-implemented method of claim 5, further comprising:

determining the first connection has been terminated; and establishing a replacement connection automatically.

9. The computer-implemented method of claim 5, wherein at least one of the first set of connection policies or the second set of connection policies includes at least one of an encryption connection policy, a compression connection policy, a latency connection policy, a throughput connection policy, a cost policy, a roaming allowed policy, a short-lived policy, a request response only policy, a secure connection requirement policy, a WiFi requirement policy, or a priority policy.

10. The computer-implemented method of claim 5, wherein the first connection is established between a requester and a requested endpoint of the requester.

11. The computer-implemented method of claim 10, wherein the first connection between the requester and the requested endpoint is via a proxy.

12. The computer-implemented method of claim 10, wherein the first connection includes at least two different communication pathways.

13. A computing device, comprising:

a processor; and a memory device including instructions, when executed by the processor, cause the computing device to:

receive, at the computing device, a request for a connection, the request specifying a first set of connection policies and a second set of connection policies, the second set of connection policies including at least one first connection policy and at least one second connection policy, the first set of connection policies corresponding to a first amount of throughput to establish the connection, and the at least one second connection policy of the second set of connection policies corresponding to a second amount of throughput larger than the first amount of throughput to establish the connection;

check information relating to a current state of the computing device, wherein the information relating to the current state of the computing device includes information relating to at least one of an existing connection, a future connection, a connection policy of a second application, battery information, location information, network congestion information, network availability information, processor information, memory information, or applications information;

determine a first connection satisfies the at least one first connection policy of the second set of connection policies based at least in part on the information relating to the current state of the computing device;

determine the first connection does not satisfy the at least one second connection policy of the second set of connection policies based at least in part on the information relating to the current state of the computing device;

determine the first connection satisfies the first set of connection policies based at least in part on the information relating to the current state of the computing device;

establish the first connection using the first set of connection policies and the at least one first connection policy of the second set of the connection policies;

receive dynamic event information associated with an application; and update one of the first set of connection policies or the at least one first connection policy of the second set of connection policies based at least in part on the dynamic event information.

14. The computing device of claim 13, wherein the request is to maximize user experience or an overall performance of the computing device.

15. The computing device of claim 13, wherein the current state indicates a low battery state of the computing device and the first connection is operable to reduce power consumption.

16. The computing device of claim 13, wherein at least a portion of the first connection is shared by one or more applications.

17. The computing device of claim 13, wherein at least one of the first set of connection policies or the second set of connection policies includes at least one of an encryption connection policy, a compression connection policy, a latency connection policy, a throughput connection policy, a cost policy, a roaming allowed policy, a short-lived policy, a request response only policy, a secure connection requirement policy, a WiFi requirement policy, or a priority policy.

18. The computing device of claim 13, wherein the first connection is established between a requester and a requested endpoint of the requester.

19. A non-transitory computer-readable storage medium including instructions for identifying elements, the instructions when executed by a processor of a computing device causing the computing device to:

receive, at the computing device, a request for a connection, the request specifying a first set of connection policies and a second set of connection policies, the second set of connection policies including at least one first connection policy and at least one second connection policy, the first set of connection policies corresponding to a first amount of throughput to establish the connection, and the at least one second connection policy of the second set of connection policies corresponding to a second amount of throughput larger than the first amount of throughput to establish the connection;

check information relating to a current state of the computing device, wherein the information relating to the current state of the computing device includes information relating to at least one of an existing connection, a future connection, a connection policy of a second application, battery information, location information, network congestion information, network availability information, processor information, memory information, or applications information;

determine a first connection satisfies the at least one first connection policy of the second set of connection policies based at least in part on the information relating to the current state of the computing device;

determine the first connection does not satisfy the at least one second connection policy of the second set of connection policies based at least in part on the information relating to the current state of the computing device;
determine the first connection satisfies the first set of connection policies based at least in part on the information relating to the current state of the computing device;
establish the first connection using the first set of connection policies and the at least one first connection policy of the second set of connection policies;
receive dynamic event information associated with an application; and update one of the first set of connection policies or the at least one first connection policy of the second set of connection policies based at least in part on the dynamic event information.

20. The non-transitory computer-readable storage medium of claim 19, wherein the instructions cause the computing device to:
determine the first connection has been terminated; and
establish a replacement connection automatically.

21. The non-transitory computer-readable storage medium of claim 19, wherein at least one of the first set of connection policies or the second set of connection policies includes at least one of an encryption connection policy, a compression connection policy, a latency connection policy, a throughput connection policy, a cost policy, a roaming allowed policy, a short-lived policy, a request response only policy, a secure connection requirement policy, a WiFi requirement policy, or a priority policy.

22. The non-transitory computer-readable storage medium of claim 19, wherein the request is to maximize user experience or an overall performance of the computing device.

* * * * *